W. HEY.
NECKTIE AND LINING THEREFOR.
APPLICATION FILED DEC. 31, 1914.
1,202,717.
Patented Oct. 24, 1916.
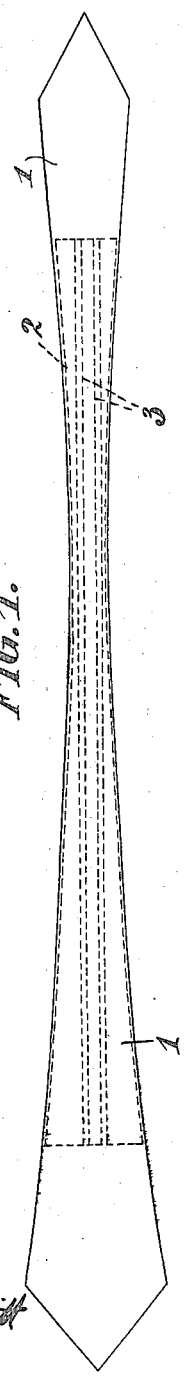
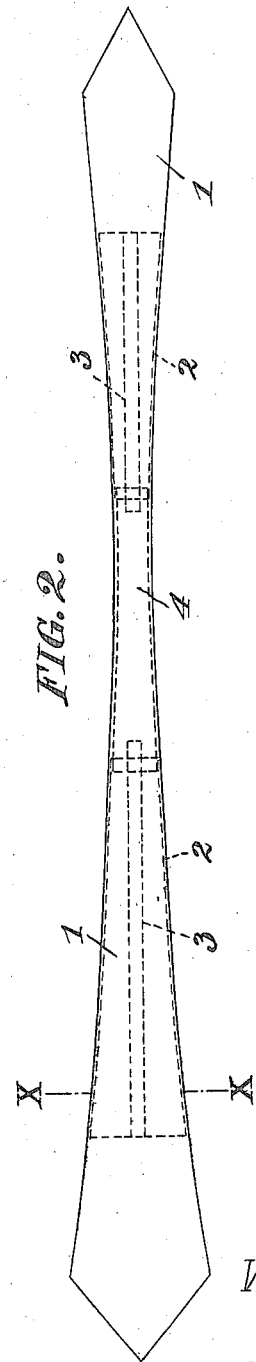
Inventor
William Hey

UNITED STATES PATENT OFFICE.

WILLIAM HEY, OF YORK, ENGLAND, ASSIGNOR TO H. GOLDSTEIN & COMPANY LIMITED, OF LONDON, ENGLAND.

NECKTIE AND LINING THEREFOR.

1,202,717.   Specification of Letters Patent.   Patented Oct. 24, 1916.

Application filed December 31, 1914. Serial No. 879,932.

*To all whom it may concern:*

Be it known that I, WILLIAM HEY, a subject of the King of Great Britain, residing at York, in the county of York, in the Kingdom of England, have invented certain new and useful Improvements in Neckties and Linings Therefor, of which the following is a specification.

The object of the present invention is an improved necktie and lining therefor.

The object of the invention is to provide an improved lining which will prevent the tie from creasing in a more effectual manner than hitherto known linings and will be nevertheless extremely simple to insert.

According to the invention I provide a loose lining consisting of a thin sheet of rubber which is allowed to expand or contract freely in the transverse direction, but is prevented from expanding or contracting in the longitudinal direction. Preferably a thin sheet of vulcanized rubber is employed which may be about one-sixtieth of an inch thick having a thin strip of tape solutioned or otherwise secured centrally throughout its length. This tape strip prevents the material from expanding or contracting longitudinally and thereby prevents the tie being permanently distorted when the knot is being made. On the other hand the lining is loosely mounted within the tie and in fact the rubber need not be secured thereto at all. Hence the perfect freedom for lateral expansion or contraction enables the rubber to exert to the utmost its function of preventing creasing and at the same time it renders the manufacture of the ties extremely simple.

The rubber may be made from mixings of very various kinds but it should be highly elastic; a suitable mixing will be the same as that of an ordinary inner tube containing for example 80 per cent. of rubber or even more, but it is unnecessary to give further details as to the nature of the rubber since it will be obvious to the rubber technologist that many different mixings will serve the desired purpose.

It is not essential to have a continuous piece of rubber since in some cases two blanks may be employed, one near each end of the tie and the rubber lining may be omitted from the thin center portion which passes around the back of the neck of the wearer. If desired such blanks may be connected through the narrow portion of the tie by a strip of fabric as shown at 4 in Figure 2. The arrangement will be understood more clearly from the accompanying drawings, in which—

Figs. 1 and 2 represent neckties having blanks consisting of one and two pieces of sheet rubber respectively, while Fig. 3 is a section through the line X—X of Fig. 2.

1 is the material of the necktie, 2 is the lining of sheet rubber and 3 is the tape strip.

I declare that what I claim is:—

1. A necktie having a lining of sheet rubber which is free to expand or contract laterally but is prevented from substantially expanding or contracting longitudinally by at least one thin strip of substantially inextensible material attached thereto.

2. A blank for lining neckties consisting of a thin sheet of rubber which is free to expand or contract laterally but is prevented from substantially expanding or contracting longitudinally by having at least one thin strip of substantially inextensible fabric secured thereto.

In witness whereof I have hereunto signed my name this 16th day of December, 1914, in the presence of two subscribing witnesses.

WILLIAM HEY.

Witnesses:
JOHN H. WILSON,
ELLEN WILSON.